United States Patent
O'Keeffe et al.

(10) Patent No.: US 8,982,899 B2
(45) Date of Patent: Mar. 17, 2015

(54) APPARATUS AND CONTROL INTERFACE THEREFOR

(75) Inventors: Conor O'Keeffe, Douglas (IE); Paul Kelleher, Classis Lake (IE); Daniel Schwartz, Scottsdale, AZ (US)

(73) Assignee: Freescale Semiconductor, Inc., Austin, TX (US)

( * ) Notice: Subject to any disclaimer, the term of this patent is extended or adjusted under 35 U.S.C. 154(b) by 1979 days.

(21) Appl. No.: 11/574,867

(22) PCT Filed: Sep. 7, 2004

(86) PCT No.: PCT/EP2004/052070
§ 371 (c)(1),
(2), (4) Date: Mar. 7, 2007

(87) PCT Pub. No.: WO2006/027026
PCT Pub. Date: Mar. 16, 2006

(65) Prior Publication Data
US 2009/0274207 A1    Nov. 5, 2009

(51) Int. Cl.
*G06F 13/42* (2006.01)

(52) U.S. Cl.
CPC .................. *G06F 13/4291* (2013.01)
USPC ............ 370/421; 370/419; 370/420; 375/238

(58) Field of Classification Search
CPC ..... H03J 3/1676; H04Q 11/0421; H03K 7/02; H03K 7/08
USPC ....................................... 370/419
See application file for complete search history.

(56) References Cited

U.S. PATENT DOCUMENTS

| | | | | |
|---|---|---|---|---|
| 5,027,347 A | * | 6/1991 | Malkki | 370/270 |
| 5,696,685 A | * | 12/1997 | Lee et al. | 705/408 |
| 5,727,216 A | * | 3/1998 | Takasu et al. | 710/260 |
| 5,757,857 A | * | 5/1998 | Buchwald | 375/271 |
| 6,005,853 A | * | 12/1999 | Wang et al. | 370/332 |
| 6,490,638 B1 | | 12/2002 | Ha et al. | |

(Continued)

FOREIGN PATENT DOCUMENTS

| | | |
|---|---|---|
| CN | 1142709 A | 2/1997 |
| CN | 1412551 A | 4/2003 |

(Continued)

OTHER PUBLICATIONS

International Application No. PCT/EP2004/052070, Search Report and Written Opinion dated Jun. 16, 2005.

(Continued)

*Primary Examiner* — Ayaz Sheikh
*Assistant Examiner* — Tarell Hampton

(57) ABSTRACT

An apparatus comprises a number of sub-systems and a control interface operably coupled to sub-systems for routing data therebetween. A strobe generation function is operably coupled to the control interface and configured to generate a plurality of different strobe signals to differentiate between different intended receiving devices. Thus, different strobe signals may be multiplexed onto a single control interface link, based on a pulse width or voltage magnitude characteristics of the respective strobe signals. A strobe decoder function is operably coupled to the control interface and configured to decode a plurality of different strobe signals to differentiate between triggering sub-systems on receiving devices.

19 Claims, 4 Drawing Sheets

(56) References Cited

U.S. PATENT DOCUMENTS

| | | | |
|---|---|---|---|
| 6,708,245 B1 | 3/2004 | Okuda | |
| 6,715,096 B2 | 3/2004 | Kuge | |
| 6,717,832 B2 | 4/2004 | Johnson et al. | |
| 6,999,733 B2* | 2/2006 | Hori et al. | 455/114.2 |
| 2002/0021449 A1* | 2/2002 | Demarest | 356/498 |
| 2003/0153277 A1* | 8/2003 | Ito et al. | 455/69 |
| 2004/0046854 A1* | 3/2004 | Omae | 347/132 |
| 2004/0058661 A1* | 3/2004 | Hsu et al. | 455/311 |
| 2004/0063469 A1* | 4/2004 | Kuwahara et al. | 455/562.1 |
| 2004/0071015 A1 | 4/2004 | Borkenhagen et al. | |
| 2004/0120305 A1* | 6/2004 | Aiken et al. | 370/347 |
| 2004/0133723 A1* | 7/2004 | Smith et al. | 710/107 |
| 2005/0138535 A1* | 6/2005 | Parthasarathy et al. | 714/796 |
| 2006/0029095 A1* | 2/2006 | Barker et al. | 370/465 |
| 2007/0160087 A1* | 7/2007 | Findlater et al. | 370/498 |

FOREIGN PATENT DOCUMENTS

| | | |
|---|---|---|
| EP | 0691630 B1 | 1/2004 |
| GB | 2324688 A | 4/1997 |
| JP | 60121848 | 6/1985 |
| JP | 8023582 A | 1/1996 |
| JP | 11215018 A | 8/1999 |
| JP | 2002280904 A | 9/2002 |

OTHER PUBLICATIONS

Fogg, Andrew, "DigRF Baseband/ RF Digital Interface Specification," Feb. 20, 2004, Digital Interface Working Group, www.digrf.com, XP002325710, 32 pages.

* cited by examiner

US 8,982,899 B2

APPARATUS AND CONTROL INTERFACE THEREFOR

FIELD OF THE INVENTION

This invention relates to an apparatus and a control interface therefor. The invention is applicable to, but not limited to, control interfaces for wireless communication devices, particularly multimode wireless communication devices.

BACKGROUND OF THE INVENTION

Wireless communication devices, such as mobile phone handsets, require a very high level of integration of hardware and firmware/software in order to achieve the necessary density of functionality, i.e. to realise the necessary functionality in a minimum device volume and at a minimum cost. An optimal wireless communication device design must also minimise power consumption in order to increase the battery call time and/or stand-by time.

Wireless communication devices also incorporate a number of distinct and operably coupled sub-systems, in order to provide the wide variety of functions and operations that a complex wireless communication device needs to perform. Such sub-systems comprise radio frequency power amplification functions, radio frequency integrated circuits (RFIC) comprising radio frequency generation, amplification, filtering, etc. functions, baseband integrated circuits (BBIC) comprising audio circuits, encoding/decoding, (de)modulation functions, as well as processing functions, etc and memory units.

Interfaces, which are often standardised to allow commonality and increased functionality between different chip-set manufacturers and different handset manufacturers, are often standardised for communicating between the respective sub-systems.

One typical interface found in a wireless communication device is the interface between a baseband integrated circuit (BBIC) and a radio frequency integrated circuit—(RFIC). Contact pins on ICs are used to route electrical signals between devices/elements/functions. It is generally desirable to minimise the number of pins in ICs used in wireless communication devices, as the use of extra pins, for example on a BBIC-RFIC interface, increase IC area, increase IC cost and complexity and increase power consumption.

In the field of mobile phones, a consortium of mobile phone manufacturers has been formed to define various sub-system interfaces, particularly interfaces between variants of second generation cellular phones (2.xG) when migrating to cover additional, future wireless communication technologies, such as multimode transceivers additionally employing third generation (3G) wideband code division multiple access (WCDMA) technology. This consortium is known as 'DigRF', and details of the defined interfaces and functionality thereof, particularly in multimode mobile phone scenario, can be found on their web site at www.digrf.com. Multimode operational specs are not yet available.

One interface being standardised by the DigRF consortium is the BB-RF interface, which encompasses a serial data/control interface for Receive (Rx) and Transmit (Tx) variants of second generation of cellular phone (2.xG) chipsets. When defining the interface to also accommodate the increased complexity and data rate required for 3G technologies, it is clearly advantageous to minimise the IC pin count.

The 2.xG standard contains a strobe signal for conveying layer 1 timing information, for example between the RFIC and BBIC. Notably, the strobe signal's width and magnitude are fixed. Thus, all strobes are indistinguishable from each other. Furthermore, the interface standard was developed with a 2.xG transceiver (TRX) only in mind. On the BBIC RFIC interface the Strobe signal is provided to support precise timing of events inside the RFIC However, it is envisaged that wireless communication devices in the future may need to accommodate multiple communication modes. So far, no solution has been proposed to convey layer 1 timing information to multiple transceivers using the same interface. The inventors of the present invention have recognised and appreciated that the obvious solution of duplicating pins, such as a 2.xG IC pin supporting strobe signals, to accommodate multiple modes is wasteful of valuable resources.

IBM's U.S. Patent Application—US 200430071015 A1—discloses a use of strobe signals in the field of SDRAM (memory) interfaces. A 'single' strobe signal is selected to accurately latch data to a Synchronous Dynamic Random Access Memory (SDRAM). A concept of transmitting a single strobe signal from different sources is also described.

However, the technique proposed in US 200430071015 A1 would still not solve the aforementioned problem of wasting valuable resources, as it suggests latching a single strobe signal, per function.

An U.S. Patent—U.S. Pat. No. 6,715,096 B2—inventor of Kuge et al. and applicant of Renesas Technology Corporation, describes a further technique of using strobe signals with interfaces to memory ICs. U.S. Pat. No. 6,715,096 B2 discloses an interface circuit device for performing data sampling at optimum strobe timing, by using stored data window information to determine the strobe timing. U.S. Pat. No. 6,715,096 B2 highlights an interface where data is latched correctly into memory by selecting an optimum delay on a latch strobe for a write/read (WR) memory.

Thus, a need exists for a mechanism, for example within a wireless communications device, to incorporate integrated circuits/sub-systems and a corresponding control interface that support strobe signals to multiple devices (for example transceivers), without incurring increased cost or complexity or increased pin count.

STATEMENT OF INVENTION

In accordance with aspects of the present invention, there is provided a control interface, an apparatus and an integrated circuit therefor are described as defined in the appended Claims.

BRIEF DESCRIPTION OF THE DRAWINGS

Exemplary embodiments of the present invention will now be described, by way of example only, with reference to the accompanying drawings, in which.

DESCRIPTION OF PREFERRED EMBODIMENTS

The preferred embodiment of the present invention will be described in terms of a control interface for a wireless communication device, such as a multimode 3G and/or 2.xG mobile telephone. However, it will be appreciated that the invention may be embodied in any apparatus that incorporates a control interface between respective sub-systems within the device. Furthermore, the inventive concepts are envisaged as being equally applicable to any interface, such as a data interface. Thus, in the context of the present invention, the term 'control interface' should be construed as encompassing any interface, particularly a control and/or data interface.

In summary, the preferred embodiment of the present invention proposes a mechanism for multiplexing multiple strobes on single control interface communication link (i.e. the same IC pin to accommodate different transceivers in a wireless communication device supporting multimode communication. The inventive concepts described herein propose to use the multiplexing of differing strobe signals to differentiate between intended state-machines or other functions internal to a sub-system such as the RFIC. In particular, different strobe signals are generated, multiplexed and decoded to trigger events on different sub-systems, based on, say a variable pulse code or variable pulse width or variable voltage magnitude associated with a strobe signal. This allows the strobe to be multiplexed to different state-machines that are internal to a radio sub-system, but still use the same interface connection.

Figure 1:
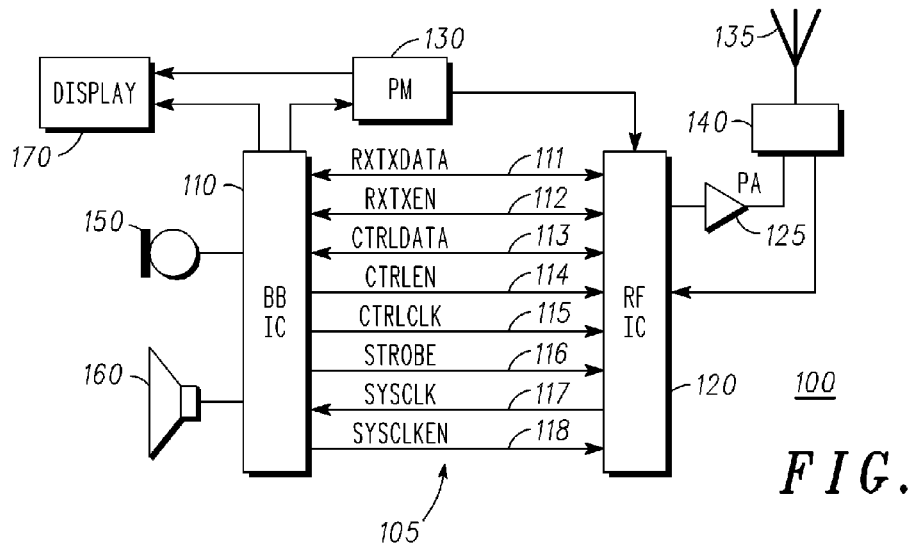
FIG. 1 illustrates a simplified block diagram of a wireless communication device, illustrating a BBIC-RFIC interface as defined by the DigRF 2.xG standard, adapted in accordance with preferred embodiments of the present invention.

Referring first to FIG. 1, there is shown a simplified block diagram of part of a wireless communication device 100, adapted to support the inventive concepts of the preferred embodiments of the present invention. The wireless communication device 100, in the context of the preferred embodiment of the invention is a multimode 3G-2.xG mobile telephone. As such, the wireless communication device 100 contains an antenna 135 preferably coupled to a 3G duplex filter or 2.xG antenna switch 140 that provides isolation between receive and transmit chains within the wireless communication device 100. The receiver chain, as known in the art, includes numerous receiver circuitries, such as receiver front-end circuitry effectively providing reception, filtering and intermediate or base-band frequency conversion. Preferably, the receiver circuitries are predominantly formed on a radio frequency integrated circuit (RFIC) 120. The RFIC 120 is preferably coupled to a number of other elements/functions (not shown) such as signal processing functions, memory elements, etc.

As known in the art, the RFIC 120 is operably coupled via a control interface to a baseband IC (BBIC) 110 that performs a number of signal processing operations at baseband frequencies, such as decoding/encoding, (de)modulation, (de-) interleaving functions and the like. The BBIC 110 is preferably coupled to a number of other elements/functions (not shown), such as signal processing functions, memory elements, etc. The BBIC 110 preferably comprises a timer or clock function (not shown), or is operably coupled to an external timer or clock, to control the timing of operations (transmission or reception of time-dependent signals) within the wireless communication device 100.

The coupling between the RFIC 120 and the BBIC 110 is preferably implemented via an RFIC-BBIC control interface 105, which comprises eight pins to carry electrical signals therebetween. The eight pins preferably comprise an RxTx-Data line 111, an RxTxEn line 112, a CtrlData line 113, a CtrlEn line 114, a CtrlClk line 115, a single Strobe line 116, a SysClk line 117 and a SysClkEn line 118. Notably, the present invention is primarily targeted at a more efficient the use of the Strobe line 116.

It is envisaged that the BBIC 110 may be operably coupled to a plurality of RFICs 120 (not shown), where each RFIC has, say, a separate CtrlEn. The BBIC is also preferably coupled to one or more output devices, such as audio speaker 160 and/or display 170.

As regards the transmit chain, of the wireless communication device 100, this includes an input device, such as a microphone 150 and/or keypad (not shown), coupled to the BBIC 110. The RFIC in a transmit operation is coupled to a radio frequency power amplifier 125 and thereafter to the antenna 135 via the antenna switch or duplex filter 140. A battery regulator (not shown) associated with the RFIC 120 is preferably under control of a power management unit 130, with the BBIC 110 maintaining control of the power management unit 130.

In accordance with the preferred embodiment of the present invention, the BBIC-RFIC interface, and therefore the BBIC and RFIC devices, has been adapted to facilitate multiplexing of strobe signals or decoding of multiplexed strobe signals received over the control interface. The preferred configurations of the RFIC-BBIC and control interface that utilise multiple multiplexed strobe signals are further described with reference to FIG. 2 to FIG. 11.

Figure 2:
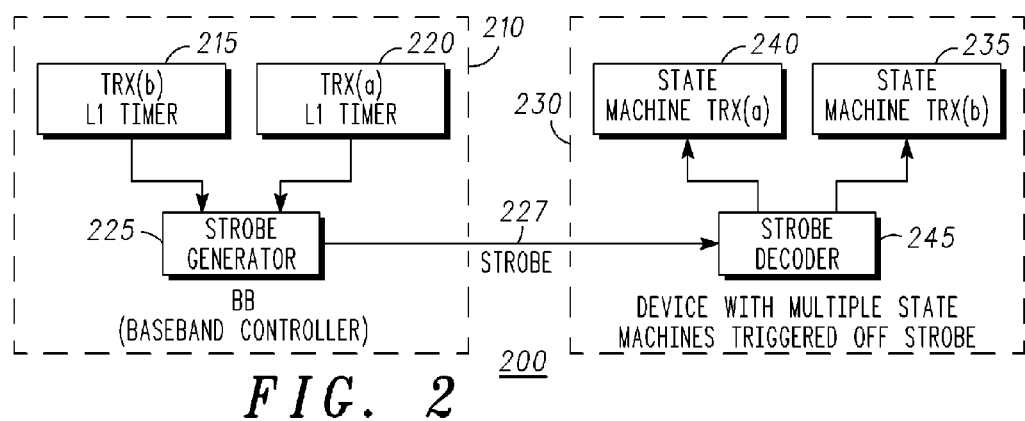
FIG. 2 illustrates a strobe generation and decoding system when one device is used with multiple internal state machines in accordance with a first embodiment of the present invention.

Referring next to FIG. 2, a strobe generation and decoding system 200 is illustrated, in accordance with a first embodiment of the present invention. Notably, the strobe generation and decoding system illustrates a scenario when one device is used with multiple internal state machines. A state machine is any device that stores the status of something at a given time and can operate on input to change the status and/or cause an action or output to take place for any given change. The main function of the state machine on the RFIC is the control and timing of calibration, RX and TX events.

A baseband controller 210 comprises the strobe generation and decoding system 200, for example a baseband controller of a BBIC, comprises two Layer-1 timers 215 and 220, operably coupled to a strobe generator 225 that generates a strobe signal 227. A Layer 1 timer function in a baseband processor is used in mobile communication terminals. It is used to correctly time events on the air interface of the respective mobile protocol. Layer 1 by its definition from the ISO 7 layer model is the physical layer control. The Layer 1 timer block is a programmable timer whose function is to generate interrupts at pre-programmed times. The interrupts will trigger intended events in software or any hard coded state machines in the mobile terminal. A corresponding receiving device 230 or element or IC, such as an RFIC comprises a strobe decoder system 245 that is operably coupled to two corresponding and respective state machines 235 and 240.

Notably, the strobe generator 225 multiplexes strobe signals and forwards them as a single multiplexed strobe signal 227 across the control interface to the strobe decoding system 245. One or both Layer-1 timers 215, 220 on the baseband controller 210 are configured to trigger the strobe generator 225 into generating respective strobe signals for multiplexing onto a single signal. Advantageously, it is envisaged that different strobe amplitudes and/or different strobe codes or strobe pulse widths can be multiplexed on a strobe signal.

Preferably, in a variable strobe code implementation, the strobe code is of a specific pulse width comprising a specific number or order of 1's and 0's to indicate which Layer-1 timer 210, 215 triggered the strobe generator function 225 and indicates the intended state machine on the receiving device 230.

Preferably, a variable strobe amplitude implementation employs a specific pulse having a pre-defined pulse width and differing voltage amplitude levels. The multiplexed strobe signal 227 is then received by the receiving device 230 and decoded therein by the strobe decoder 245. The decoded and de-multiplexed strobe signal then triggers one or both of the internal state machines 235, 240 inside the device 230, depending upon the strobe amplitude.

In this manner, a BBIC, for example, is able to send a plurality of different strobe signals across a single communication line on a control interface. A strobe receiving device, or subset of a device, is configured to respond or act upon a decoded strobe input, for example if the strobe width is within a predefined tolerance. A predefined tolerance is the lower to upper limit of the strobe variable characteristic (i.e. pulse width or amplitude). In order to decode a strobe a hysteresis about its nominal value is desirable to ensure correct decoding. This hysteresis would be defined within the predefined tolerance of the Strobe variable characteristic.

Figure 3:
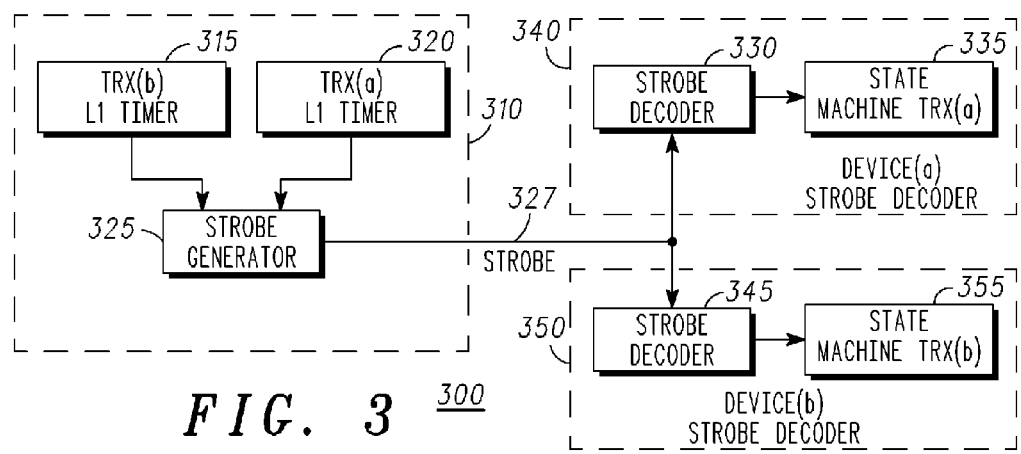
FIG. 3 illustrates a strobe generation and decoding system when multiple devices are used in accordance with a second embodiment of the present invention.

Referring next to FIG. 3, a strobe generation and decoding system 300 is illustrated, when multiple devices 340, 350 are connected to the baseband controller 310, in accordance with a second embodiment of the present invention. Each of the multiple corresponding receiving devices (or elements or ICs, such as an RFIC) preferably comprise a strobe decoder system 330, 345 and one or more state machines 335, 355 internal to the devices 340 350.

In this embodiment, one or both Layer-1 timers 315, 320 on the baseband controller 310 are again able to trigger the strobe generator 325. The strobe generator 325 generates a specific multiplexed strobe signal 327 (based on a number of variable strobe codes and/or strobe amplitudes). Again, the strobe generator 325 forwards the multiplexed strobe signal 327 across the control interface to one or more of the devices 340, 350. The multiplexed strobe signal 327 is decoded and de-multiplexed into multiple differing strobe signals, such that each device 340, 350 is configured to receive a particular strobe signal 327. If the strobe signal 327 is valid for the respective device 340, 350 then the valid decoded strobe will trigger the internal device's state machine 335, 355.

Again, it is envisaged that different strobe signals can be generated by using different strobe codes and/or strobe pulse widths and/or strobe amplitudes. Although the preferred embodiments of the present invention are described in terms of using any one of these characteristics to distinguish between an intended receiving state machine, it is envisaged that combinations of these and any other appropriate distinguishing character may be used.

In this manner, a BBIC is able to send a plurality of different strobe signals across a single line on a control interface to multiple receiving devices, elements or ICs. A strobe receiving device, or subset of a device, is configured to respond or act upon a decoded strobe input, for example by determining whether the strobe width of a particular strobe signal is within a predefined tolerance.

Figure 4:
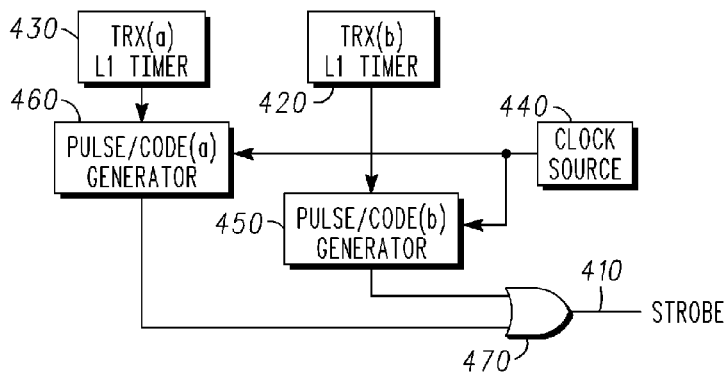
FIG. 4 illustrates a multiple strobe width or code generation system in accordance with a third embodiment of the present invention.

Referring next to FIG. 4, a multiple strobe width or code generation system 400 is illustrated in accordance with a third embodiment of the present invention. In this third embodiment of the present invention, two Layer-1 timer functions 420, 430 are shown (only two are shown for clarity purposes) whereby each Layer-1 timer function 420, 430 is able to trigger a respective pulse code (or pulse width) generator 450, 460.

Notably, and advantageously, the Layer-1 timers 420, 430 are able to generate triggers at the same time or independently. This facilities the possibility of two or more L1 timers on the baseband to operate independently and not constrained by the strobe generation mechanism. The pulse code generators 450, 460 are preferably clocked by a clock source 440. The respective pulse code generator 450, 460 generates a code pulse width of a known fixed width (e.g. N clock periods wide). Each output of the pulse code generator 450, 460 is then combined logically in function 470 to generate a single multiplexed strobe signal 410 for forwarding via the coupled control interface.

Figure 5:
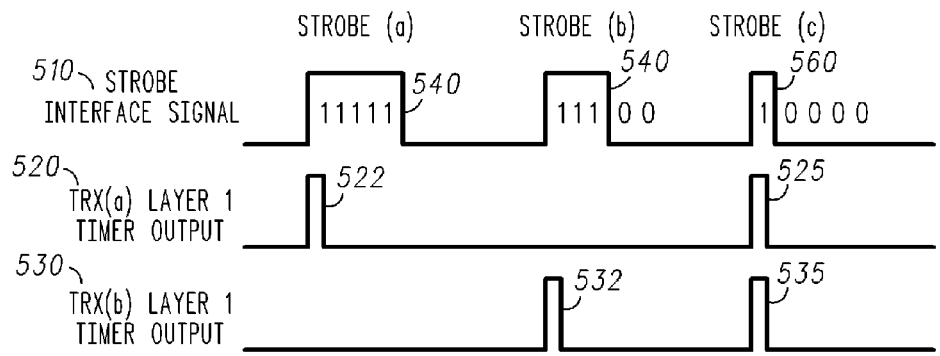
FIG. 5 illustrates a timing diagram of strobe generator inputs and resultant outputs in accordance with the third embodiment of the present invention.

Referring next to FIG. 5, a timing diagram 500 illustrates strobe generator waveforms (inputs 520, 530 and resultant outputs 510), in accordance with the third embodiment of FIG. 4. As illustrated on a first Layer-1 waveform, a first Layer-1 timer triggers 522 the pulse code generator. The pulse code generator generates a Strobe interface output signal 510 comprising a specific code 540 that indicates that the Layer-1 timer 522 has triggered the generation of the Strobe interface signal. Similarly, a second Layer-1 timer output 532 may also trigger the (respective) pulse code generator. The pulse code generator generates a Strobe interface output signal 510 comprising a specific code 540 that again indicates that the second Layer-1 timer 535 has triggered the generation of the Strobe interface signal. Thus, preferably each Layer-1 timer generates a separate strobe code. If both Layer-1 timers generate simultaneously a trigger pulse 525, 535, then it is envisaged that both of the outputs of the pulse code generators are combined logically to generate a further specific strobe code 560. The Strobe generated by the Layer 1 timers is preferably of a pre-defined width (for example 'N' clock periods). However, it is envisaged that the pre-defined pulse width may be variable, dependent upon the implementation.

Figure 6:
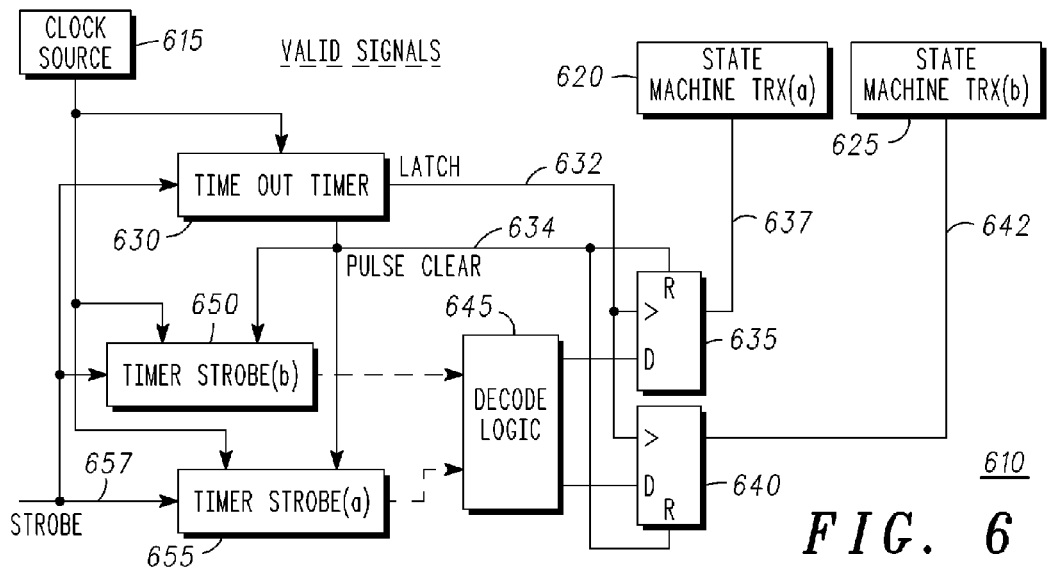
FIG. 6 illustrates a strobe decoder arrangement in accordance with the first, second or third embodiments of the present invention.

Referring next to FIG. 6, a strobe decoder arrangement 600 is illustrated in accordance with the second or third embodiments of the present invention. Here, a multiplexed strobe signal 657 is received across the control interface and input to both a time-out timer 630 and the strobe decoders, in this case strobe decoders 650, 655. It is noteworthy that two strobe decoders are shown for clarity purposes only. The time-out timer 630 and the strobe decoders 650, 655 are clocked by a clock source 615, which may or may not be located within the receiving device, element or IC.

In operation, the respective strobe decoder(s) 650, 655 generate(s) a pulse only if the strobe code of the received strobe signal 657 is valid for that particular strobe decoder block. The outputs of the strobe decoder block(s) is/are then input to registers/latches 635, 640. Preferably, after a predefined time and once the strobe signal 657 has been detected, the time-out timer 630 generates a latch signal 632. The latch signal 632 is used to enable/latch the strobe decoder outputs into the respective registers/latches 635, 640.

The output of the register/latch 637, 642 then triggers a respective state machine 620, 625, if the received strobe signal 657 was valid for that respective strobe decoder block.

After the timer strobe outputs have been latched, the time-out timer 630 generates a pulse clear signal 634 to clear the outputs of the strobe decoders.

In this embodiment of a decoder, there is preferably a fixed decode time, depending upon the pulse width input to the decoder.

Figure 7:
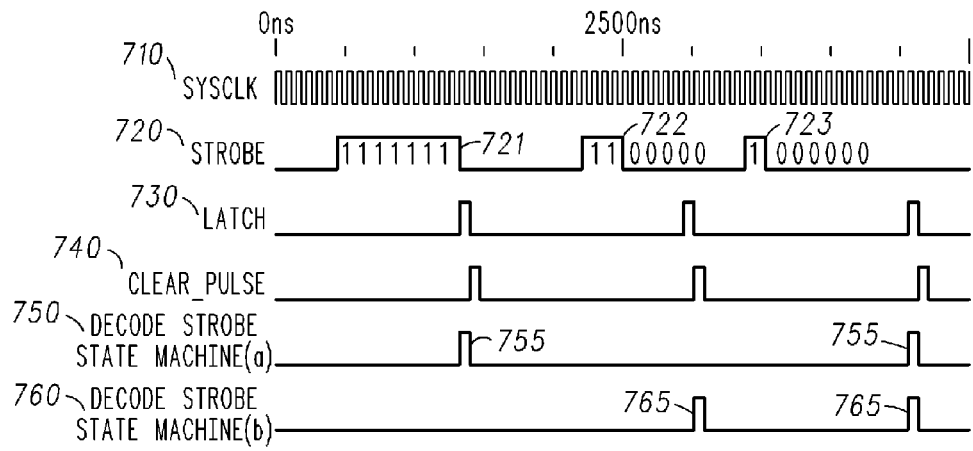
FIG. 7 illustrates a timing diagram of a strobe decoding operation in accordance with the first, second or third embodiments of the present invention.

Referring next to FIG. 7, a timing diagram 700 of a multiplexed strobe generated signal and decoding thereof is illustrated, in accordance with the decoder embodiment of FIG. 6. A first waveform illustrates the system clock 710 generated by the clock source. A second waveform 720 indicates the input strobe signal (say Strobe signal 652 of FIG. 6) to the decoder. Each input strobe signal is decoded by each timer strobe to determine whether it is a valid strobe signal, in order to trigger one or all of the internal state machines. Notably, the strobe signal illustrates three different strobe signals 721, 722, 723 configured based on respective strobe pulse code words.

A third waveform illustrates the latch pulse 730 generated from the time-out timer, say time-out timer 630 of FIG. 6. A fourth waveform illustrates the clear_pulse signal 740, which is used to reset the output of the strobe decoders and registers/latches. Finally, the last two waveforms 750, 760 illustrate the outputs of the registers, which are used to trigger the state machines.

Figure 8:
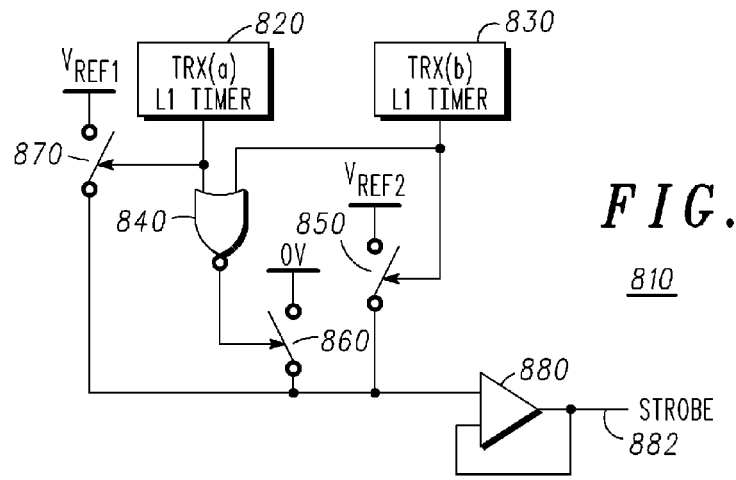
FIG. 8 illustrates a strobe generation multiplexing circuit, in accordance with a fourth embodiment of the present invention.

Referring next to FIG. 8, a strobe generation circuit 800 (based on a strobe voltage magnitude) is illustrated, in accordance with a fourth embodiment of the present invention. The strobe generation and decoding system 800 is configured such that a layer-1 timer 820, 830 triggers a pulse. The pulse will trigger a particular switch 850, 870, thereby selecting a particular voltage reference. Otherwise, a zero voltage reference 860 is selected via the combinatorial logic element 840. The outputs are connected to output buffer 880 to generate a strobe amplitude signal 882.

The first voltage reference ($V_{ref}1$) 870 and the second voltage reference ($V_{ref}2$) 850 are set to different voltage levels. If both Layer-1 timers 820, 830 trigger at the same time, then the result is the combination of both $V_{ref}1$ 870 and $V_{ref}2$ 850 signals used to generate a third voltage level, on the output buffer 880, and thereafter strobe amplitude signal 882.

The voltage level of the strobe amplitude signal 882 is decoded at the receiving side of the control interface and interpreted as corresponding to both (or more) of the intended state machines coupled thereto.

Notably, it is envisaged that the respective strobe signals can also be multiplexed based on the magnitude of the strobe falling within a predefined window tolerance, (i.e. +/− variation in amplitude).

Figure 9:
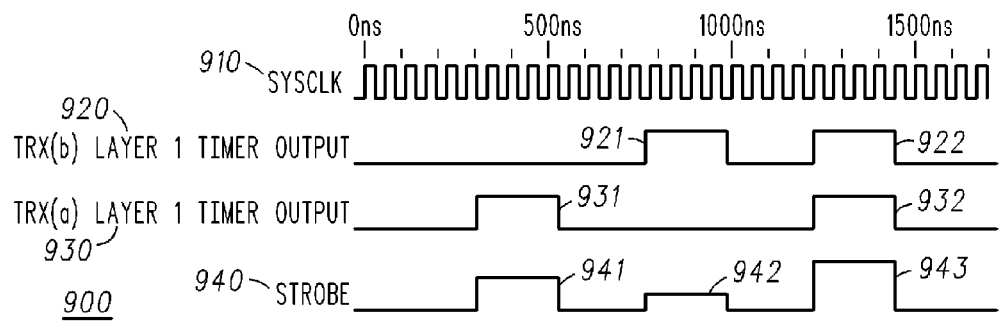
FIG. 9 illustrates a timing diagram of multiplexed strobe signals, in accordance with the strobe generator circuit of FIG. 8.

Referring next to FIG. 9, a timing diagram 900 of the multiplexed (different magnitude) strobe signals is illustrated, in accordance with the strobe generator circuit of FIG. 8. A first waveform illustrates the system clock 910 generated by the clock source. The two layer-1 timer waveforms 920, 930 of FIG. 8 are illustrated. Notably, in operation, when the first layer-1 timer outputs a trigger signal 931, a (high) voltage reference 941 is applied to the output strobe 940. When the second layer-1 timer outputs a trigger signal 921, a second (low) voltage reference 942 is applied to the output strobe 940. Additionally, in a case where both layer-1 timers (say layer-1 timers 820 830 of FIG. 8) output a trigger signal 922, 932, a combination of voltage references 943 is applied to the output strobe 940.

In this manner, multiplexed strobe signals of representing different voltage magnitudes can be generated and sent across the control interface by a particular strobe generator and interpreted in the receiving device as corresponding to the intended state machine.

Figure 10:
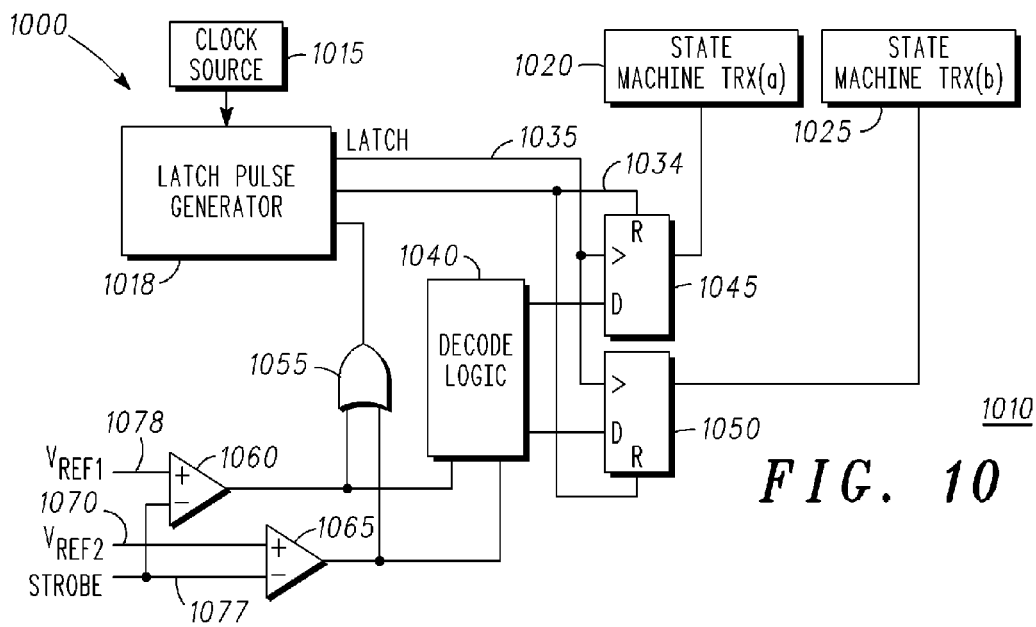
FIG. 10 illustrates a circuit diagram of a decoder configured to decode the multiplexed (different magnitude) strobe signals of FIG. 8 and FIG. 9.

Referring next to FIG. 10, a preferred circuit diagram 1000 of a decoder 1010, configured to decode the multiplexed (different magnitude) strobe signals of FIG. 8 and FIG. 9, is illustrated. An input strobe signal 1077 is input 1070, 1075 to two comparators 1060, 1065, where different voltage levels Vref1 and Vref2 reference each comparator. The reference voltages $V_{ref}1$ and $V_{ref}2$ applied to the comparators represent threshold logic levels for the multi-level strobe signal on the control interface.

The outputs of the two comparators 1060, 1065 are respectively input into registers/latches 1045, 1050 via decode logic function 1040. The outputs of the two comparators 1060, 1065 are also respectively input into a combinatorial logic function 1055, which provides an output to a latch pulse generator 1030. The latch pulse generator 1030 is operably coupled to a clock source 1015.

In operation, a latch signal 1035 is triggered by the latch pulse generator 1030, in response to an output from the combinatorial logic 1055, when either of the signals 1060, 1065 output from the comparator equate to, or is greater than, either of the voltage references $V_{ref}1$ and $V_{ref}2$ (i.e. +/− variation in amplitude). Thereafter, the latch signal 1035 is used to latch the outputs of the decode logic function 1040 into the respective register(s)/latch(es) 1045, 1050.

After the decode logic outputs have been latched, the latch pulse generator 1030 generates a pulse clear signal 1034 to reset the respective register(s)/latch(es) 1045, 1050. If a valid strobe signal 1077 has been received by the decoder 1010, the output of the register/latch 1045, 1050 then triggers a respective state machine 1020, 1025.

It is envisaged that in a further embodiment, it is possible to include another (or more) comparator(s) for the case where a combination of two (or more) voltage(s) references are input to the decoder 1010 in order to trigger both (or more) state machines 1020, 1025 within the device or between a number of devices.

Figure 11:
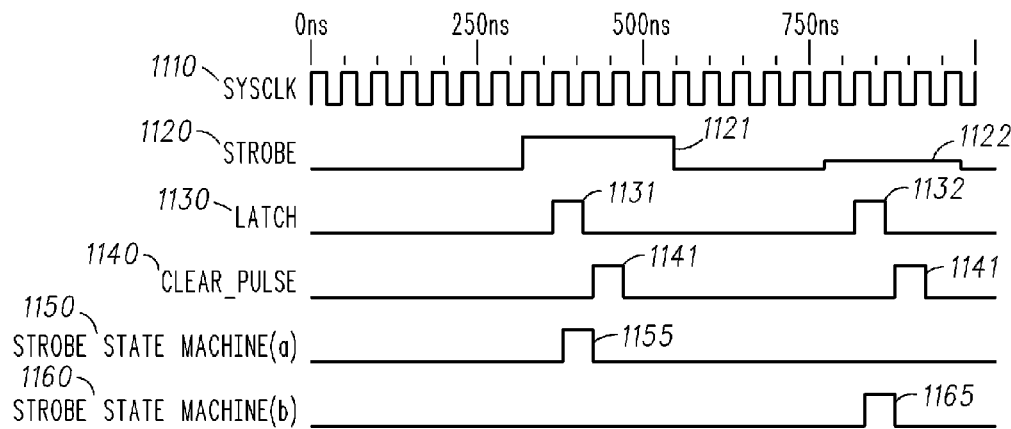
FIG. 11 illustrates a timing diagram of associated waveforms employed by the strobe magnitude decoder circuit of FIG. 10, in accordance with the preferred embodiment of the present invention.

Referring next to FIG. 11, a timing diagram 1100 of associated waveforms employed by the strobe magnitude decoder circuit of FIG. 10 is illustrated, in accordance with a preferred embodiment of the present invention. A first waveform illustrates the system clock 1110 generated by the clock source. A second waveform 1120 illustrates the input strobe signal (say input strobe signal 1077 of FIG. 10) to the device. A third waveform 1130 illustrates the latch pulse generated from the latch pulse generator. Notably, each strobe signal is compared to the voltage references $V_{ref}1$ and $V_{ref}2$ to determine whether the strobe signal is a valid signal that will trigger one (or both/all) of the internal state machines 1020 1025. A fourth waveform 1140 illustrates the clear pulse signal that is used to reset the respective register(s)/latch(es). Finally, two waveforms 1150, 1160 illustrate the outputs of the registers 1155, 1165 that are used to trigger the state machines.

In this manner, a multiplexed strobe signal containing signals of different magnitudes can be received across the control interface and decoded by a particular receiving device and each respective multiplexed strobe interpreted in the receiving device as corresponding to the intended state machine.

Figure 12:
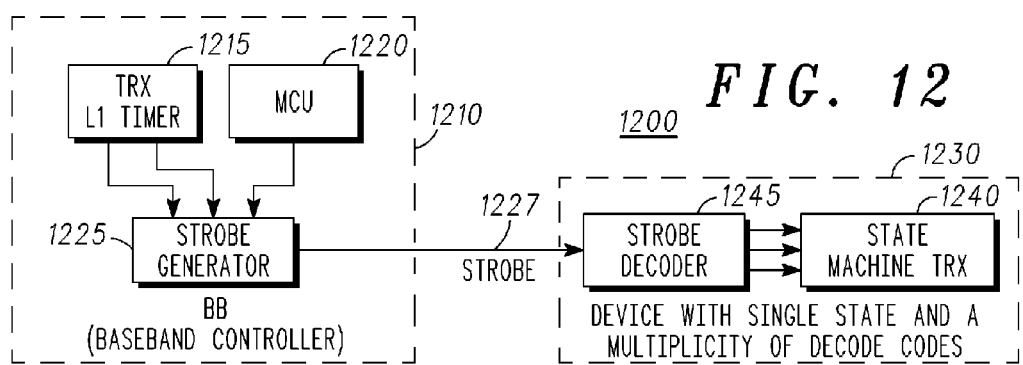
FIG. 12 illustrates a strobe generation and decoding system, in accordance with a further embodiment of the present invention.

Referring next to FIG. 12, a further strobe generation and decoding system 1200 is illustrated a state machine on the RFIC with a Strobe decoder capable of decoding different Strobe types, but interfacing to a single state-machine, in accordance with a preferred embodiment of the present invention.

Notably, the further strobe generation and decoding system 1200 comprises a state machine on the RFIC with a Strobe decoder capable of decoding different Strobe types, but interfacing to a single state-machine 1240.

A baseband controller 1210 comprises the strobe generation and decoding system 1200, for example a baseband controller of a BBIC, comprises a Layer-1 timer 1215, operably coupled to a strobe generator 1225 that generates a strobe signal 1227. The strobe Generator 1225 is able to receive inputs from an MCU 1220 or a layer 1 timer event generator 1215 and generate different Strobe types accordingly.

A corresponding receiving device 1230 or element or IC, such as an RFIC comprises a strobe decoder system 1245 that is operably coupled to a corresponding respective state machine 1240.

Notably, the state machine 1240 on board the device 1230 is able to use a multiplicity of input codes to determine a multiplicity of state transitions, depending on the Strobe signal 1227. The Strobe generator 1225 encodes a different Strobe type depending on the source of the input. Advantageously, it is envisaged that different strobe amplitudes and/or different strobe codes or strobe pulse widths can be multiplexed on a strobe signal.

The above embodiments are not considered as the only arrangements capable of utilising the inventive concepts described herein, as other architectures may also be implemented that could benefit from multiplexing strobe signals to multiple devices (for example transceivers), without incurring increased cost or complexity or increased pin count. An example of such architecture would be Power Management systems where a L1 time event to trigger such functions, such as ramping of power supplies or low battery voltage detection.

It will also be appreciated by a skilled artisan that although the above concepts have been described with reference to a BBIC-RFIC interface, the inventive concepts are equally applicable to any control interface or apparatus comprising a control interface. Furthermore, it is envisaged that the inventive concepts are not limited to a dual 3G-2.xG wireless communication device, but are applicable to any device that is capable of supporting strobe signals, for example a wireless communication device supporting Bluetooth™ or ultra wideband orthogonal frequency division multiplex (UWB OFDM) technology.

Furthermore, it is envisaged that the aforementioned inventive concepts can be applied to most transceiver architectures and platform solutions, i.e. a semiconductor manufacturer may employ the inventive concepts in a design of a stand-alone RFIC and/or BBIC and/or any other sub-system element.

It will be understood that the control interface and operation thereof, as described above, aims to provide one or more of the following advantages:
(i) Different strobe signals to distinguish between intended receiving devices/state machines may be generated by varying a strobe width, applying a strobe code or applying various strobe magnitudes or other distinguishing characteristic of the respective strobe signals;
(ii) Different strobe signals may be multiplexed onto a single strobe signal; and
(iii) In a receiving device, the multiplexed strobe signal may be decoded according to the various strobe magnitudes and/or strobe widths/codes, in order to trigger particular events on different sub-systems.

Thus, the present invention provides a number of advantages over current apparatuses incorporating control interfaces, such as mobile phones. In the context of a mobile phone, the provision of a control interface that supports strobe multiplexing and de-multiplexing/decoding in the above manner, for example between a RFIC and a BBIC in a 2.xG and/or 3G wireless communication device, is less wasteful of valuable resources. Furthermore, the proposed control interface allows a reduction in volume, cost and power consumption of the wireless device, when compared to current solutions, thus providing significant advantage to IC and wireless communication device manufacturers.

Whilst the specific and preferred implementations of the embodiments of the present invention are described above, it is clear that one skilled in the art could readily apply variations and modifications of such inventive concepts.

Thus, a means of incorporating a control interface in an apparatus, for example a wireless communication device, has been described, where the aforementioned disadvantages with prior art arrangements have been substantially alleviated.

The invention claimed is:

1. Apparatus comprising:
a number of sub-systems and a control interface operably coupled between a number of sub-systems for routing data therebetween, a strobe generator operably coupled to the control interface, and a plurality of timers configured to trigger the strobe generator, the strobe generator is configured to generate a plurality of different strobe signals in response to triggers from the plurality of timers, wherein each of the plurality of different strobe signals comprises a single pulse utilized to select at least one of different intended receiving devices based on at least one of differing voltage magnitude characteristics of the single pulse, or differing codes employed by the single pulse, wherein the single pulse includes a combined magnitude for multiple receiving devices in response to the plurality of timers generating one or more triggers at the same time.

2. Apparatus according to claim 1 wherein the plurality of different strobe signals are multiplexed on to a single signal on the control interface.

3. Apparatus according to claim 1 wherein the plurality of different strobe signals is generated to trigger different events on different sub-systems.

4. Apparatus according to claim 1, wherein the strobe generator multiplexes strobe signals and forwards the multiplexed strobe signals across the control interface to a strobe decoding system.

5. Apparatus according to claim 1 wherein the strobe generator to generate a multiplexed strobe signal comprising a strobe signal associated with at least one of the plurality of timers.

6. Apparatus according to claim 1 wherein the control interface operably couples a baseband sub-system to a radio frequency sub-system.

7. Apparatus according to claim 1 wherein the apparatus is a wireless communication device and the differing strobe signals on the multiplexed strobe signal identify different transceivers in the wireless communication device.

8. Apparatus according to claim 7 wherein the wireless communication device supports multimode operation of third generation and one or more variants of second-generation mobile telecommunication.

9. Apparatus according to claim 7 wherein the apparatus comprises number of sub-systems, in turn comprising a radio frequency integrated circuit and/or a baseband integrated circuit.

10. Apparatus according to claim 9 wherein the strobe generator is capable of generating variable codes transmitted to a single state-machine whereby a multiplicity of codes can determine a number of different state transitions.

11. An integrated circuit for use in a wireless communication device for routing data to a number of sub-systems via a control interface, the integrated circuit comprising:
a strobe generator operably coupled to the control interface, the strobe generator configured to generate or decode a plurality of different strobe signals in response to triggers from a plurality of timers, wherein each of the plurality of different strobe signals comprises a single pulse utilized to select at least one of different intended receiving devices based on at least one of differing voltage magnitude characteristics of the single pulse, or differing codes employed by the single pulse, the single pulse includes a combined magnitude for multiple receiving devices in response to the plurality of timers generating one or more triggers at the same time.

12. An integrated circuit according to claim 11 wherein the integrated circuit comprises a multiplexor that multiplexes a plurality of different strobe signals on to a single signal on the control interface.

13. An integrated circuit according to claim 11 wherein the plurality of different strobe signals is multiplexed on to a single signal on the control interface based on a magnitude of the strobe signal falling within a predefined window tolerance.

14. An integrated circuit according to claim 11 wherein the strobe generator to generate a multiplexed strobe signal comprising a strobe signal associated with at least one of the plurality of timers.

15. An integrated circuit according to claim 14 wherein the plurality of timers are to generate one or more triggers independently.

16. A method comprising:
routing data between a plurality of sub-systems;
receiving triggers from a plurality of timers;
generating, at a strobe generator, a plurality of different strobe signals in response to receiving the triggers from the plurality of timers, wherein each of the plurality of strobe signals comprises a single pulse, wherein the single pulse includes a combined magnitude for multiple receiving devices in response to the plurality of timers generating one or more triggers at the same time; and
selecting at least one of different intended receiving devices based on at least one of differing voltage magnitude characteristics of the single pulse, or differing codes employed by the single pulse.

17. The method of claim 16 further comprising:
generating, at a strobe decoder of one of the at least one of the different intended receiving devices, a pulse in response to the single pulse of a strobe signal being valid for the strobe decoder;
latching an output of the strobe decoder; and
generating a pulse clear signal to clear an output of the strobe decoder in response to the output of the strobe decoder being latched.

18. The method of claim 16 wherein the selecting the at least one of different intended receiving devices is based on the differing voltage magnitude characteristics of the single pulse.

19. The method of claim 16 the selecting the at least one of different intended receiving devices is based on differing codes employed by the single pulse.

* * * * *